Dec. 28, 1937.     L. D. KAY     2,103,750
BRAKE AND ANCHORING MEANS THEREFOR
Filed Feb. 10, 1936     2 Sheets—Sheet 2
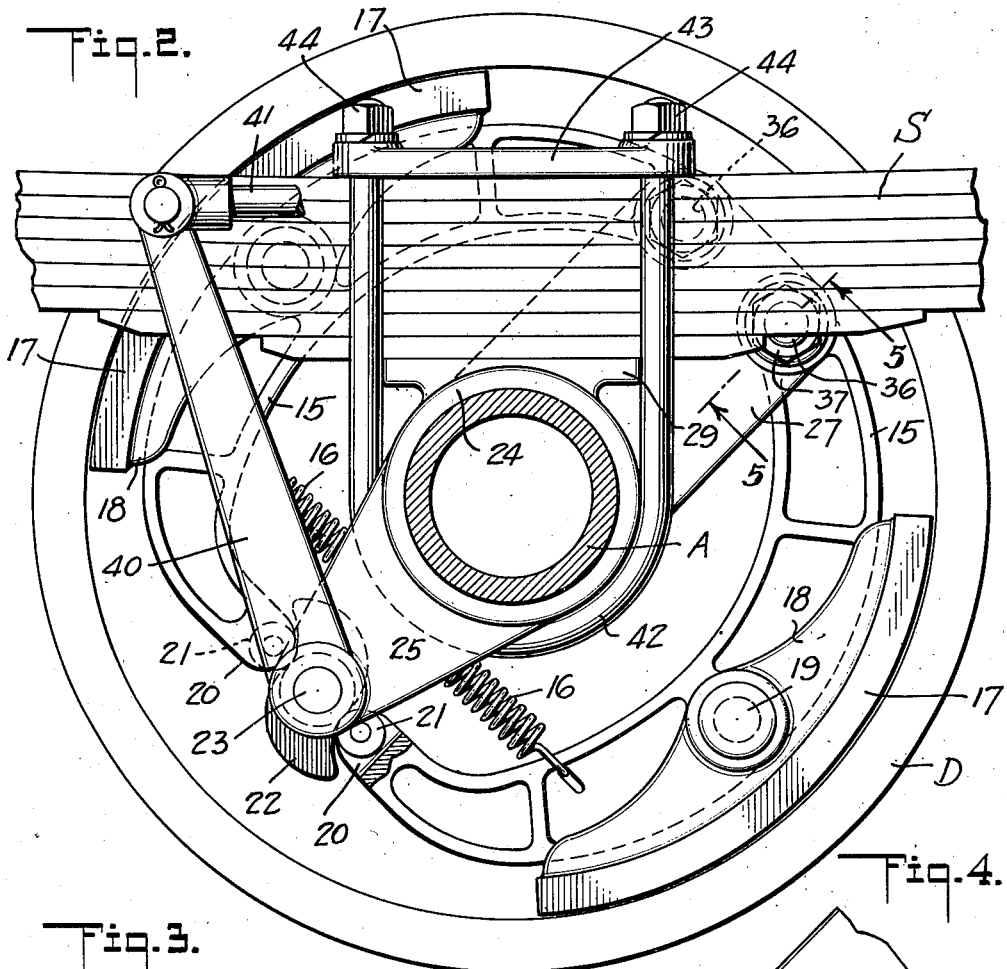
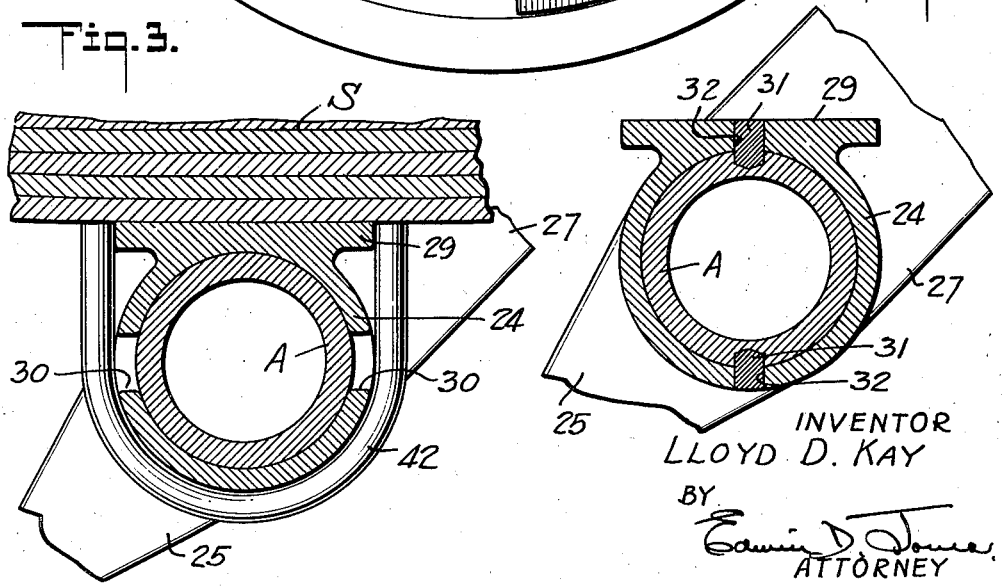
INVENTOR
LLOYD D. KAY
BY
ATTORNEY Patented Dec. 28, 1937

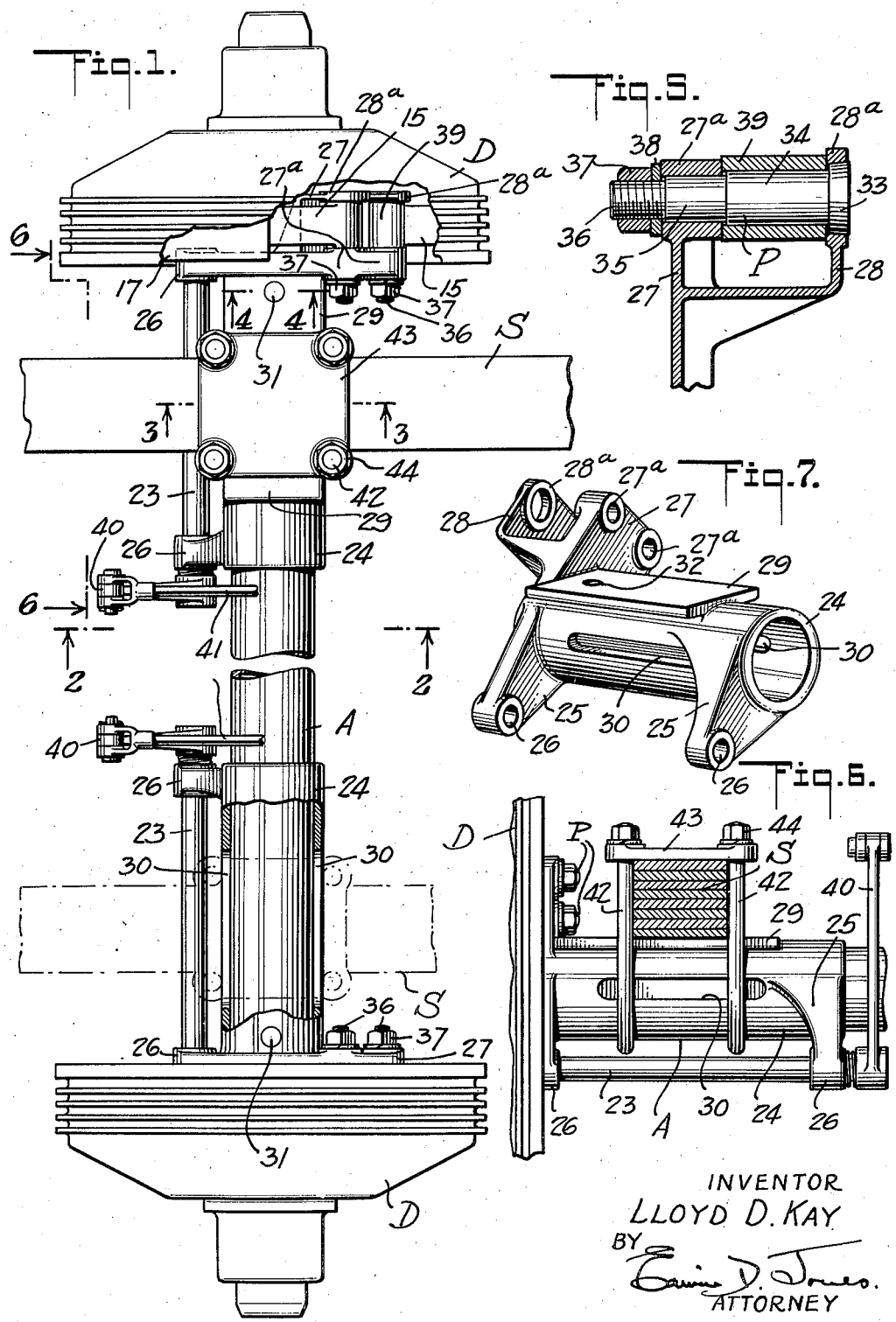

2,103,750

UNITED STATES PATENT OFFICE 2,103,750

BRAKE AND ANCHORING MEANS THEREFOR

Lloyd D. Kay, Alhambra, Calif., assignor to Kay Brunner Steel Products, Inc., a corporation Application February 10, 1936, Serial No. 63,174

13 Claims. (Cl. 188—205)

My invention relates to brakes for trucks and the like of that type which is mechanically operated and wherein the shoes and their actuating mechanisms are mounted or anchored on an axle of the vehicle. Heretofore, with such brakes, the shoes and their actuating mechanisms have been anchored on solid axles of non-circular cross section. This necessitates the use of specially constructed brackets and numerous screws and bolts, aside from the many drilling and tapping operations required to apply the screws and bolts in the anchoring of the brackets on the axle.

It is a purpose of my invention to greatly simplify anchoring on an axle of the brake shoes and the actuating mechanism, by the employment of a tubular axle, and an anchoring frame which is cast as a single unit to provide the necessary supports for the brake parts, and which can be readily secured to the axle for rigidly holding such supports in fixed position on the axle.

It is also a purpose of my invention to provide an anchoring frame characterized by the inclusion of a sleeve having openings therein arranged to permit constriction of the sleeve in a manner to secure it in fixed position on an axle.

A further purpose of my invention is a provision of an anchoring frame which has formed integral therewith a seat for a vehicle spring, and wherein the sleeve of the frame can be constricted through the application of the conventional U-bolts for securing the spring on the seat, to secure the sleeve and seat in fixed position on the axle.

Another purpose of my invention is the provision of a brake having one or more arms pivotally mounted to occupy expanded or contracted position with respect to a brake drum, and wherein a brake shoe is pivotally mounted on the arm for floating movement to assure free and uniform action in both applying and releasing the shoe with respect to the drum.

Another purpose of my invention is the provision in a brake of an eccentric pin for pivotally mounting the brake arm on the anchoring frame, wherein the pin and the frame are constructed to permit the secure fixing of the pin in the frame against chattering and yet allow the necessary circumferential adjustment of the pin when and as required.

I will describe only one form of brake, one form of eccentric pin, and one form of brake anchoring frame, each embodying my invention, and will then point out the novel features thereof in claims.

In the accompanying drawings:

Fig. 1 is a view showing in top plan one form of brake, and one form of anchoring frame, each embodying my invention and in applied position to the axle and springs of a truck.

Fig. 2 is an enlarged, vertical, sectional view taken on the line 2—2 of Fig. 1.

Figs. 3 and 4 are enlarged, vertical, sectional views taken on the lines 3—3 and 4—4, respectively, of Fig. 1.

Fig. 5 is a sectional view taken on the line 5—5 of Fig. 2.

Fig. 6 is a vertical, sectional view taken on the line 6—6 of Fig. 1.

Fig. 7 is a detailed, perspective view of the anchoring frame shown in the preceding views.

With specific reference to the drawings, a vehicle axle A of tubular form is shown in Fig. 1, and this axle has its ends constructed to permit journaling thereon of two conventional brake drums D, as well as truck wheels (not shown) which are adapted to be fixed to the drums, as will be understood. Each drum constitutes part of a brake, and as the construction, manner of anchoring, and mode of operation of each brake is identical, a description of one will suffice for both.

In addition to the drum D each brake includes two arcuate arms 15 pivotally supported on the axle A at one of their ends, to occupy contracted and expanded positions, with springs 16 connected to the arms as shown in Fig. 2, for yieldably urging the arms to contracted position. A brake shoe 17 is pivotally mounted medially of its ends on each arm to engage or disengage the drum D according as the respective arm occupies expanded or contracted position.

To mount the shoe on the arm a pair of flanges 18 are formed on the shoe which are spaced to receive the arm, and a pin 19 extends through the flanges and arm. In this manner the shoe is pivotally supported on the arm for limited floating movement in order that it may be self-adjusting with respect to the drum upon a brake application and in a manner to give complete contact of the braking surface under any operating condition.

Again in Fig. 2, the free ends of the brake arms 15 are each formed with spaced ears 20 in which a roller 21 is so journaled that its periphery has contact with one side of an S-type lift cam 22. The roller for the other brake arm has contact with the opposite side of the cam, as shown. The cam is fixed on one end of a shaft 23 so that by rotation thereof the cam can be actuated to expand the arms 15 against the tension of the springs 16, and thus move the shoes into engagement with the drum in effecting a brake application. By employing the rollers 21, friction between the cam and the rollers is reduced to a minimum, but what is more important, the necessity is eliminated of machining the cam to effect easy operation of the arms.

For mounting or anchoring on the axle A the brake arms 15 and the shaft 23, I provide a frame which is structurally characterized by the fact that it is cast in a single piece, and can be readily applied and securely fixed to the axle without the necessity of employing bolts and screws and drilling and tapping the axle and frame to receive them. Furthermore, when applied to the axle the frame provides, in combination with the axle, a structure of the requisite strength to adequately support the brake arms and shaft.

As best shown in Fig. 7, this frame comprises a sleeve 24 from the ends of which project a pair of tapered extensions or brackets 25 having their free ends formed with bearings 26. Projecting from the sleeve, at a point opposed diametrically to one of the brackets 25, is a yoke having one arm 27 alined with the bracket and another arm 28 spaced in parallelism with the arm 27.

In Figs. 5 and 7, the yoke arms 27 and 28 are shown as formed with a pair of tubular bosses 27ª and 28ª, respectively, the bosses 27ª being relatively long and having bores of uniform diameter, while the bores of bosses 28ª are aligned with the bosses 27ª but tapered so as to have the form of a frustrated cone. Formed on the top of the sleeve 24 is a plate 29 which constitutes a seat for a spring, as will be more fully described hereinafter.

The sleeve 24 is formed with openings 30 so arranged therein as to permit constriction of the sleeve to reduce its internal diameter, it being understood that the sleeve is constructed of steel sufficiently resilient to allow the necessary constriction for the purpose intended. In the present instance, the openings 30 are shown as slots diametrically opposed and extending longitudinally of the sleeve for a major portion of its length.

To apply the frame to the axle the sleeve 24 is designed so that it can be freely slid onto the axle. Once in position the sleeve is pinned to the shaft by first drilling through the sleeve and plate 29 and into the axle in the manner illustrated in Fig. 4, and then forming pins 31 in the openings 32 so made, by introducing metal into the openings and welding it to the sleeve and axle.

In this manner the sleeve is fixed to the shaft against lengthwise and circumferential movements, with the plate 29 uppermost, the brackets 25 extending downwardly, and the yoke arms 27 and 28 extending upwardly at the end of the axle.

With the frame so fixed to the axle, the brake arms 15 are mounted on the yoke by a pair of pins P. As best shown in Fig. 5, each pin is received in a pair of bosses 27ª and 28ª, and it comprises a head 33 of frusto-conical form with a taper corresponding to that of the bore of the boss 28ª so that it has a snug fit within the boss. Contiguous to the head 33 the shank of the pin is formed with an eccentric portion 34 of a length to terminate short of the boss 27 in order to permit axial adjustment of the pin as a whole. To the left of the eccentric portion the pin shank has a concentric portion 35 which extends through the boss 27ª, while that end portion 36 of the shank which projects from the boss, is screw-threaded to receive a nut 37 secured in position by a lock washer 38.

Such a construction and mounting of the pin P, permits it to be adjusted axially so as to cause the head to fit tightly in the boss and to thus prevent chattering of the pin in the boss. Such adjustment is effected by manipulation of the nut 37 to draw the head 33 inwardly of the boss 28ª.

The respective brake arm 15 is mounted on the eccentric portion 34 of the pin by the provision of a sleeve 39 cast integral with the arm. Thus, by circumferential adjustment of the pin through loosening of the nut, the eccentric portion 34 can be moved to vary the starting position of the brake arm in its expanding movement under operation of the cam 22. In this manner the brake arm is adjustable to compensate for wear of the shoe and drum, and to vary the pressure with which the shoe engages the drum upon a brake application.

As shown in Figs. 1, 2, and 6, the shaft 23 is journaled in the bearings 26 with the cam 22 thus supported in proper position between the rollers 21, so that by rotation of the shaft the cam can be actuated to expand the brake arms. To the inner end of the shaft is fixed an arm 40, and to this arm is connected a rod 41 which extends forwardly of the vehicle for connection to any suitable operating mechanism.

The plate 29 forms a seat for a leaf spring S of the truck or other vehicle with which the brake is associated. For securing the spring to the plate a pair of conventional U-bolts 42 and an upper plate 43, are employed. As applied, the bights of the bolts embrace the sleeve 24 (Fig. 3) with the upper ends of the bolts extending through the upper plate 43 and secured therein by nuts 44 (Fig. 6). By adjustment of the nuts the bolts can be drawn into such firm relation to the sleeve 24 as to constrict the latter into tight embracing relation to the axle so that it is immovable thereon. Although the pins 31 assist in securing the sleeve on the axle, they have been provided primarily to hold the sleeve in proper position on the axle prior to application of the bolts and springs.

Although I have herein shown and described only one form of brake, one form of eccentric pin, and one form of brake anchoring frame, each embodying my invention, it is to be understood that various changes and modifications may be made herein without departing from the spirit of my invention and the spirit and scope of the appended claims.

I claim:

1. In combination; a vehicle axle; a sleeve surrounding said axle and having means to permit constriction thereof to embrace the axle; a member fixed on the sleeve; a plate adapted to be superposed on a spring seated on said member; and U-bolts embracing the sleeve and adjustable in said plate for constricting the sleeve to clamp said axle.

2. In combination; a vehicle axle; a sleeve surrounding said axle and having slots therein arranged to permit constriction of the sleeve to embrace said axle; a member fixed on the sleeve; a plate adapted to be superposed on a spring reposing on said member; and means embracing the sleeve and adjustable in said plate for constricting the sleeve to clamp said axle.

3. In combination; an axle; a sleeve surrounding said axle and having means arranged to permit constriction thereof to embrace the axle; and means arranged for securing a spring to the sleeve in such a manner as to constrict the sleeve.

4. As an article of manufacture, a brake-supporting sleeve for axles, having slots so formed therein as to permit constriction of the sleeve to embrace an axle.

5. An anchor for vehicle brakes, comprising; a sleeve adapted to receive and be fixed to an axle; extensions formed integral with the sleeve and having bearings therein in which a cam shaft is adapted to be journaled; a yoke formed integral with the sleeve including spaced arms having openings therein adapted for the reception of pivot pins; and a spring seat formed integral with said sleeve.

6. An anchor for vehicle brakes, comprising; a sleeve adapted to receive and be fixed to an axle; extensions formed integral with the sleeve and having bearings therein in which a cam shaft is adapted to be journaled; a yoke formed integral with the sleeve including spaced arms having openings therein adapted for the reception of pivot pins; and a spring seat formed integral with said sleeve; said sleeve having openings therein arranged to permit constriction of the sleeve to embrace the axle.

7. In combination; a yoke having spaced arms provided with registering openings, the wall of one of which is tapered; and a pivot pin having a head disposed within said tapered opening and correspondingly tapered; and a nut threaded on the opposite end of said pin from that of the head to engage the respective arm of the yoke in a manner to effect axial adjustment of the pin, and tightly seat the head in said tapered opening.

8. In combination; a yoke including spaced arms having registering openings therein, the wall of one opening being tapered; a pivot pin for brake shoes extended through said openings and having a tapered head fitted in said tapered opening, a cam formed integral with said pin of a length to permit axial adjustment of the pin in the arms; and a nut threaded on that end of the pin opposite from said head to engage the corresponding arm for tightly fitting the head within the tapered opening.

9. In combination; an axle of tubular form; a sleeve slidably fitted on the axle and having openings therein arranged to permit constriction of the sleeve to tightly embrace the axle; a member formed on the sleeve; and means for constricting and thus securing the sleeve to the axle so that the member is uppermost.

10. In combination; an axle; a brake supporting sleeve around the axle having openings therein arranged to permit the sleeve to be constricted to embrace the axle and thus secured thereto against relative rotation and endwise movement; and means for constricting the sleeve.

11. In combination; an axle; a brake supporting sleeve around the axle having openings therein arranged to permit the sleeve to be constricted; means on the sleeve engaging the axle for securing the sleeve in a predetermined circumferential position on the axle; and means engaging the sleeve for constricting the latter to embrace the axle and thus lock the sleeve against relative rotation and endwise movement.

12. An anchor for vehicle brakes, comprising; a sleeve adapted to receive and be fixed to an axle; extensions formed integral with the sleeve and having bearings therein in which a cam shaft is adapted to be journaled; and a yoke formed integral with the sleeve including spaced arms having openings therein adapted for the reception of pivot pins.

13. As an article of manufacture, a brake-supporting sleeve for axles, having openings therein to permit constriction thereof for embracing an axle; and a spring seat formed integral with said sleeve.

LLOYD D. KAY.